Sept. 16, 1947. W. O. SCHICK 2,427,476
ELECTRICALLY HEATED MULTIPLE-COIL WATER HEATER
Filed July 5, 1945
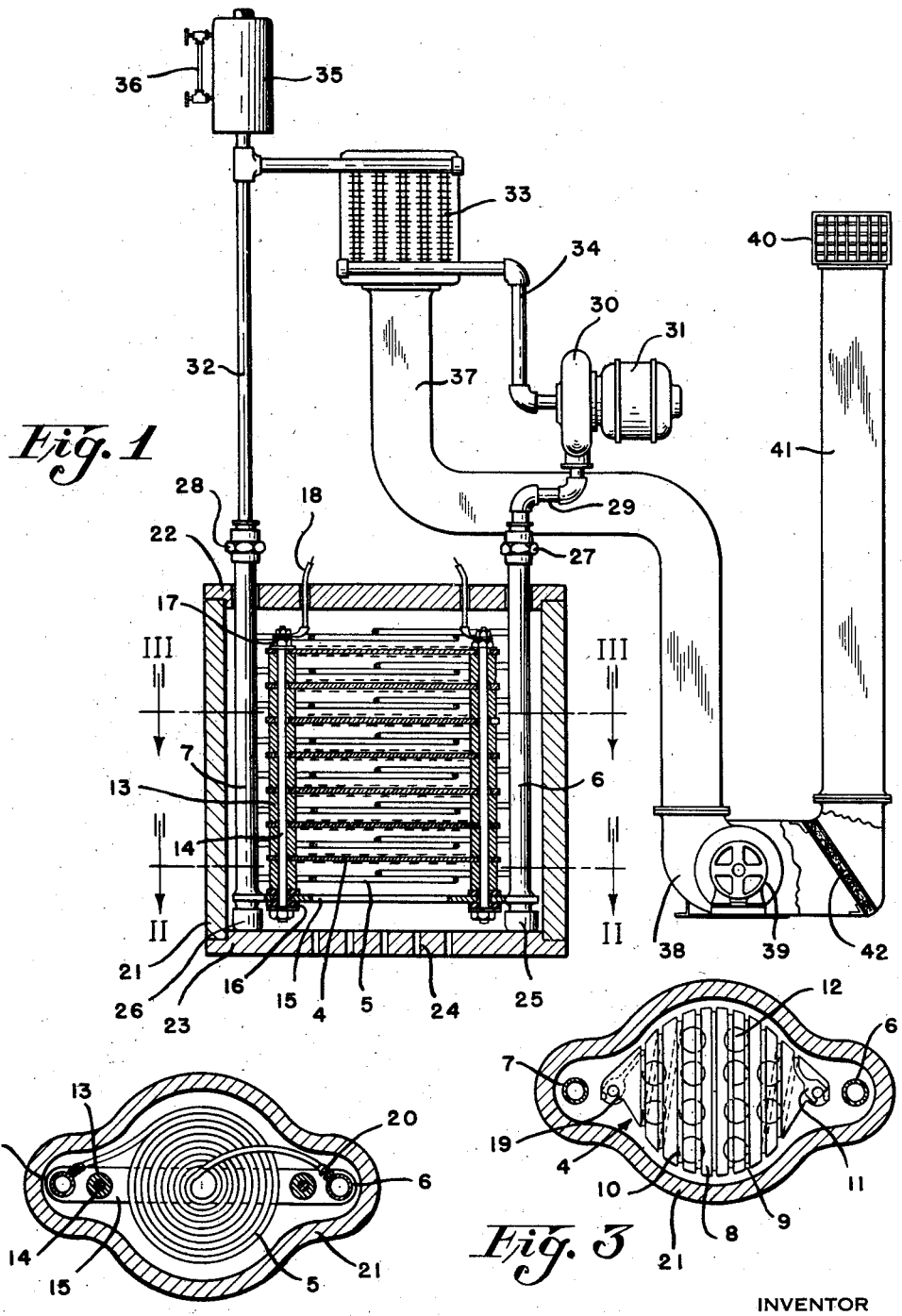
INVENTOR
WENZEL O. SCHICK
BY
ATTORNEY Patented Sept. 16, 1947

2,427,476

UNITED STATES PATENT OFFICE 2,427,476

ELECTRICALLY HEATED MULTIPLE-COIL WATER HEATER

Wenzel O. Schick, Detroit, Mich.

Application July 5, 1945, Serial No. 603,370

4 Claims. (Cl. 219—39)

This invention relates to electrical heating means and, in particular, it relates to an electrically operated furnace of the hot water type adapted for a circulating system in combination with unit radiating means.

In general, my invention comprises a plurality of spirally wound tubes fixed in spaced relationship and connected with diametrically opposed headers, and having interposed between each spaced spirally disposed tubing an electrical resistance element; the entire assembly of tubing and elements being confined within a heat insulating inclosure; and connecting conduits joining the spirally disposed tubing for communicating with radiating means, including a pump for circulating water through the system. An air duct including a blower is utilized in combination with the radiating means for facilitating transfer of heat from the radiating means.

By providing spirally disposed tubing in close relationship with an electrical heating element, and by providing a multiplicity of such units, it is possible to utilize a small quantity of water in the heating system and to obtain high efficiency in the initial heating of the water in the system. These units, because of their compactness, are readily capable of being housed within a heat insulating container, thereby preventing heat losses, and providing a system in which the electrical energy is quickly and efficiently converted into heat in a practical form readily available for circulation to points at which the heat is desired.

It is, therefore, among the objects of my invention to provide an electrical heating source which utilizes a small quantity of water; to provide a heating source which functions quickly and efficiently in heating a quantity of water; to provide an electrically operated hot water heating system which is compact in assembly, and which may be easily insulated to prevent heat losses; to provide an electrically heated hot water system utilizing a multiplicity of individual heating elements in which the elements are easily accessible and replaceable; and, to provide an electrically operated furnace of the hot water type which is inexpensive in cost, and which may be easily manufactured.

These and other objects and advantages will appear more fully in the following detailed description when considered in connection with the accompanying drawing, in which:

Figure 1 is an elevational view, partly in section, of a complete heating system constituting an embodiment of my invention;

Figure 2 is a transverse view, in section, of a heat transfer unit taken along lines II—II of Figure 1; and, Figure 3 is a transverse view, in section, of an electrical heating element taken along lines III—III of Figure 1.

With reference to the drawing, I show an embodiment of my invention in the form of a heating system comprising principally a multiplicity of flat disposed electrical heating elements 4 interposed between spirally wound conduits 5, the ends of which communicate with diametrically opposed headers 6 and 7.

The electrical elements 4 comprise essentially a flat base 8 formed of an insulating material such as mica, asbestos, porcelain, or the like, having a plurality of indentations 9 in the outer edge to serve as a retaining groove for a metallic resistance ribbon or wire 10. The grooves 9 are positioned so as to permit the ribbon 10 to be wrapped in a continuous length in spaced relationship from one side of the base 8 to the diametrically opposite side. Each end of the ribbon 10 terminates with a terminal 11 to permit connection with means hereinafter described.

A plurality of holes or openings 12 are provided in the base 8 to lighten the structure and to permit greater utilization of the heating from the resistance ribbon 10. Each unit 4 constitutes an electrical element having a rating of 100 or 150 watts. I have found that a rating of this capacity operates effectively for a heating furnace to be used in the average domestic home. A multiplicity of these units 4 positioned in spaced relationship constitutes the complete electrical heating source for the furnace. Each unit 4 is operated by metallic spacers 13 retained by a central bolt 14. The lower portion of the bolt is supported by a plate 15 through a connection in the form of an electrically insulating bushing 16. A clamping nut 17 at the upper end of the bolt 14 permits all of the heating units 4 to be clamped together in tight relationship. The terminals 11 engage with the spacers 13 to form a complete circuit to the bolt 14. An electrical wire 18 connects the bolt 14 with a source of electrical energy. A similar system of spacers, bolt and connecting electrical wire is diametrically opposed and also supported by a plate 15 to constitute the complete heating element assembly. The base 8, as shown in Figure 3, is provided with notches 19 for embracing the bolt 14 and for permitting easy assembly or removal of the heating units with the main assembly.

The spiral conduit 5 constitutes a pancake element and functions as a liquid containing means which is heated by the electrical elements 4. The tubing unit is formed of close spirally wound tubing, preferably made of copper and having a diameter of approximately one-quarter inch. The outside end of the spirally wound conduit connects with the header 7, while the inner end of the spirally wound conduit overlaps a portion of the convolutions of the tubing and joins with the header 6. The tubing may be joined to the header by brazing, or it may be joined by a conventional connection 20. Connected with the headers 6 and 7 and also supporting the multiple electrical element units is a plate 15. This plate serves to combine the headers, the spirally wound tubing and the electrical elements and attachments in one complete unit. Encasing this entire assembly is a housing comprising an outer wall 21, a top cover 22, and a bottom member 23. These walls are formed of a heat insulating material, such as brick, asbestos; or it may be in the form of a double metal wall with rock wool insulation therebetween. Venting apertures 24 extend through the bottom member 23.

The headers 6 and 7 are of a size larger than that of the tubing units 5 and have a cross-sectional area substantially equal to the additive cross-sectional area of the multiple tubing units 5 with which the headers are associated. Caps 25 and 26 enclose the lower end of the headers 6 and 7, respectively. The upper end of the headers 6 and 7 connect with unions 27 and 28 and to a conventional forced circulation radiating system. The inlet header 6 connects with piping 29 to which is associated a centrifugal circulating pump 30 driven by a motor 31. By this means, water is forced into the headers 6 and through the multiple tubing units 5 where the water becomes heated and is forced into the header 7. From the header 7 the forced hot water is moved into the piping 32 and into a conventional finned tube radiating unit 33. Thereafter, the hot water moves from the radiating unit 33 through a pipe 34 and back into the centrifugal pump 30 where the water is again circulated in a similar cycle of operation. While only one radiator unit 33 is illustrated, it is to be understood that any desired number of such units may be employed to form a multiple radiator system. In order to insure an adequate supply of water in the system and to permit expansion of water within the system, a reservoir 35 is connected with the piping 32 at a point above the highest level of the radiating system. A water level glass 36 is associated with the reservoir 35 to provide visual means for determining the proper quantity of water within the system.

In cooperation with the radiating unit 33 is a duct 37 extending to a centrally located blower 38 driven by a motor 39. By this means, forced air is circulated through the radiator 33 thereby increasing the transmission of heat from the radiator unit. Also located in the same general area as the radiator unit 33 is a cold air register 40 which, through a duct 41, connects to the intake of the blower 38. A filter 42 may be used between the duct 41 and the blower 38 for removing impurities in the forced air system.

By providing multiple units, both in the electrical heating elements and in the spirally wound conduits associated in close proximity with the heating elements, it is possible to break up the volume of liquid to be heated in relatively small units so that the water may be heated rapidly without the necessity of utilizing high wattage or large volume water capacity. By this arrangement, it is believed apparent that I have provided a novel heating system capable of reacting quickly to heat water in the entire system and to operate efficiently and economically.

While I have shown a preferred embodiment of my invention, it is to be understood that I contemplate those modifications which appear obviously within the spirit of my invention and which appear in the scope of the appended claims.

Having thus described my invention, what I claim and desire to protect by Letters Patent is:

1. In a heating apparatus of the character described a plurality of electrical heating elements, a pair of spaced electrical conductors adaptable for supporting said electrical heating elements, spacer collars associated with the electrical conductors for maintaining the heating elements in fixed spaced relation, a plurality of liquid conducting conduits positioned in spaced relation to the electrical heating elements and in close proximity thereto, each of said units comprising a conduit in close-wound spiral formation having its convolutions lying in a single plane, a pair of spaced headers located adjacent the liquid conducting units and having a connection with each end of the liquid conducting units, a heat insulating enclosure encasing the heating apparatus, means joining the headers and the conductors together whereby a unitary assembly is formed from which said enclosure may be removed without disturbing the operation of the heating apparatus, a piping system interconnecting the headers, and one or more radiators interposed between the conduits of the piping system.

2. In a heating apparatus of the character described, a plurality of electrical heating elements, a pair of spaced electrical conductors adaptable for supporting said electrical heating elements, spacer collars associated with the electrical conductors for maintaining the heating elements in fixed spaced relation, a plurality of units of liquid conducting conduits positioned in spaced relation to the electrical heating elements and in close proximity thereto, each of said units comprising a conduit in close-wound spiral formation having its convolutions lying in a single plane, the inner end of the spirally wound conduit lying in overlapping and adjacent relation with the principal body of the unit, a pair of spaced headers located adjacent the liquid conducting units and having a connection with each end of the liquid conducting units, a heat insulating enclosure encasing the heating apparatus, means joining the headers and the conductors together whereby a unitary assembly is formed from which said enclosure may be removed without disturbing the operation of the heating apparatus, a piping system interconnecting the headers, and one or more radiators interposed between the conduits of the piping system.

3. In a heating apparatus of the character described, a plurality of electrical heating elements, each of said elements comprising a flat plate of electrically insulating material and a resistance wire helically wrapped around the plate, a pair of spaced electrical conductors adaptable for supporting said electrical heating elements, spacer collars associated with the electrical conductors for maintaining the heating elements in fixed spaced relation, a plurality of units of liquid conducting conduits positioned in spaced relation to the electrical heating elements and in close proximity thereto, a pair of spaced headers located adjacent the liquid conducting units and having a connection with each end of the liquid conducting units, a heat insulating enclosure encasing the heating apparatus, means joining the headers and the conductors together whereby a unitary assembly is formed from which said enclosure may be removed without disturbing the operation of the heating apparatus, a piping system interconnecting the headers, and one or more radiators interposed between the conduits of the piping system.

4. In a heating apparatus of the character described a plurality of electrical heating elements, each of said elements comprising a flat plate of electrically insulating material and a resistance wire helically wrapped around the plate, a pair of spaced electrical conductors adaptable for supporting said electrical heating elements, spacer collars associated with the electrical conductors for maintaining the heating elements in fixed spaced relation, a plurality of units of liquid conducting conduits positioned in spaced relation to the electrical heating elements and in close proximity thereto, each of said units comprising a conduit in close-wound spiral formation having its convolutions lying in a single plane, the inner end of the spirally wound conduit lying in overlapping and adjacent relation with the principal body of the unit, a pair of spaced headers located adjacent the liquid conducting units and having a connection with each end of the liquid conducting units, a heat insulating enclosure encasing the heating apparatus, means joining the headers and the conductors together whereby a unitary assembly is formed from which said enclosure may be removed without disturbing the operation of the heating apparatus, a piping system interconnecting the headers, and one or more radiators interposed between the conduits of the piping system.

WENZEL O. SCHICK.

REFERENCES CITED

The following references are of record in the file of this patent:

UNITED STATES PATENTS

| Number | Name | Date |
|---|---|---|
| 1,654,551 | Muhleisen | Jan. 3, 1928 |
| Re. 16,716 | Nesmith | Aug. 23, 1927 |
| 1,820,458 | Jenkins | Aug. 25, 1931 |
| 1,077,035 | Boyer | Oct. 28, 1913 |
| 2,116,896 | Hudson | May 10, 1938 |
| 1,907,357 | Kovesdy | May 2, 1933 |
| 2,166,509 | Smith | July 18, 1939 |